United States Patent [19]

Moody et al.

[11] 4,076,094

[45] Feb. 28, 1978

[54] VEHICLE ENGINE SPEED CONTROL SYSTEM

[75] Inventors: Warren L. Moody, Milford; Edward D. Baugh, Union Lake, both of Mich.

[73] Assignee: General Motors Corporation, Detroit, Mich.

[21] Appl. No.: 715,984

[22] Filed: Aug. 19, 1976

[51] Int. Cl.² ............................................. B60K 31/00
[52] U.S. Cl. .................................... 180/108; 123/108; 123/140 R
[58] Field of Search ................... 180/105 R, 106, 107, 180/108, 109, 110; 123/140 R, 140 FG, 108, 110, 111, 112

[56] References Cited

U.S. PATENT DOCUMENTS

| 2,771,788 | 11/1956 | Frick et al. | 74/472 |
| 2,875,635 | 3/1959 | Fleck et al. | 74/472 |
| 2,916,100 | 12/1959 | Teetor | 180/109 |
| 2,972,390 | 2/1961 | Bunker | 180/109 |
| 3,125,086 | 3/1964 | Fox | 123/140 R |
| 3,209,853 | 10/1965 | Bunker | 180/108 |
| 3,747,580 | 7/1973 | Savage | 123/140 R X |
| 3,886,922 | 6/1975 | Frick | 123/140 R |

Primary Examiner—Philip Goodman
Assistant Examiner—John A. Pekar
Attorney, Agent, or Firm—Robert J. Outland

[57] ABSTRACT

A limiting speed mechanical engine governor has a speed responsive fuel decreasing mechanism opposed by a high speed spring, the effective force of which controls the maximum governed speed of the engine. A speed adjuster, such as an air actuated piston, is arranged to act against the operative end of the high speed spring to controllably reduce its preset speed setting force and thus provide for controlled reduction of the maximum governed speed of the engine. A control system is disclosed for use on a vehicle, such as a diesel engine powered truck, to permit using the variable maximum speed capability of the governor as a road speed control for the vehicle or to provide a reduced controlled engine speed for operating engine driven accessories when the vehicle is stationary.

8 Claims, 4 Drawing Figures

VEHICLE ENGINE SPEED CONTROL SYSTEM

CROSS REFERENCE TO RELATED APPLICATION

In addition to the vehicle engine speed control system disclosed and claimed herein, this application also discloses certain improved governor arrangements which are the sole invention of Edward D. Baugh and are disclosed and claimed in his copending U.S. patent application Ser. No. 700,292, filed June 28, 1976 and assigned to the assignee of the present invention.

BACKGROUND OF THE INVENTION

This invention relates to control systems for mechanical engine governors of internal combustion engines and, more particularly, to the provision of speed adjusting means for reducing the maximum controlled engine speed, as desired by the operator. In its more specific aspects, the invention relates to the provision of a variable maximum speed-idle speed mechanical governor for use on diesel engines for automotive vehicles in conjunction with a system to permit use of the governor as a road speed control for the vehicle or as a means for regulating engine speed while driving accessories when the vehicle is stationary.

It is known in the art relating to governors for internal combustion engines, particularly for compression ignition engines, to provide a mechanical governor having means for controlling the engine idle speed, as well as for preventing operation above a preset maximum speed or range or speeds. One type of governor used for such purposes has centrifugal flyweights which act through a linkage against an idle speed spring and, upon its full compression, on a high spring which controls maximum engine speed. Between the preset idle and maximum speeds, the fuel input is controlled manually by the operator of the engine or vehicle, with the speed controlling function of the governor coming into play only to prevent the engine from operating below its idle speed or above its preset maximum speed.

In certain applications, particularly vehicle applications of engines having governors of the abovementioned type, there has been a need to provide some means for automatically controlling the engine speed at an intermediate level for operating accessories that might be driven by the engine while the vehicle is stationary. Numerous arrangements have been made for accomplishing this purpose and in some cases modifications of the basic governor design have been made. While some such arrangements have been useful, it is believed that none have accomplished the desired purpose in the manner of the present invention. Further, there has been an increasing need to provide in conjunction with automotive vehicles an adjustable road speed control. In the past, this function has been accomplished by the use of a separate vehicle speed governing device.

SUMMARY OF THE INVENTION

The present invention provides for a relatively simple modification of a previously known mechanical engine governor arrangement which, in combination with a novel actuating and control mechanism — preferably air operated, provides an arrangement wherein the engine governor may be utilized as a vehicle road speed control, as well as providing a controllable maximum speed capability for operating engine driven accessories and being able to perform the usual idle speed and maximum speed controlling functions for normal vehicle operation. These and other advantages of the invention, as well as a full understanding of its features, will be gained from the following description of certain preferred embodiments taken together with the accompanying drawings.

DESCRIPTION OF FIGURES 1 AND 2

Figure 1:
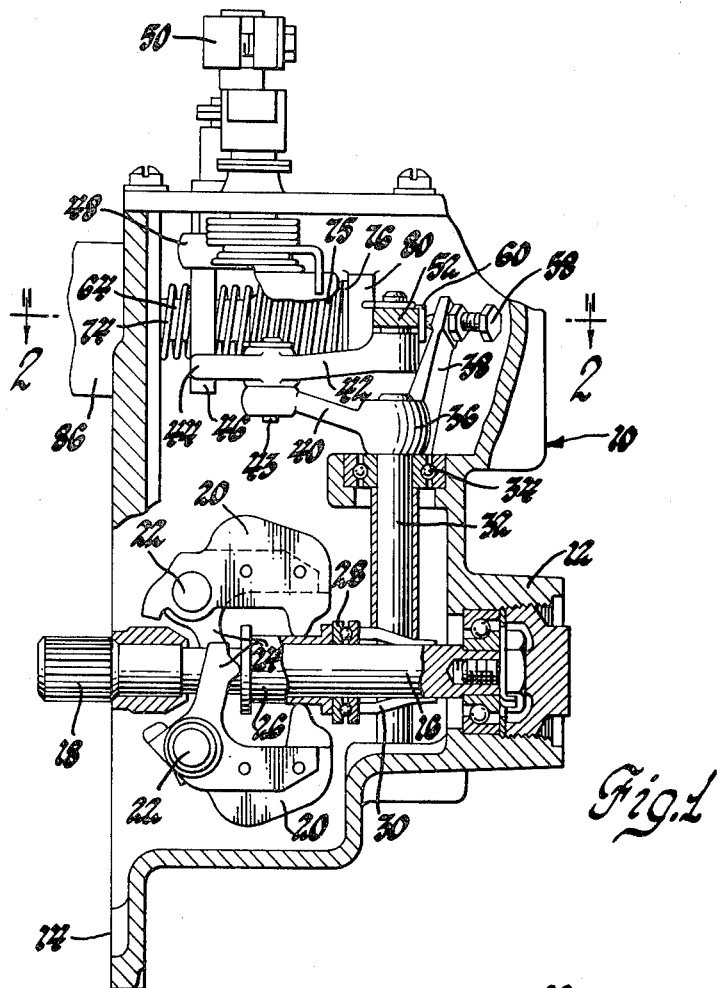
FIG. 1 is a cross-sectional view of a portion of the mechanism of a mechanical engine governor formed according to the invention.
Figure 2:
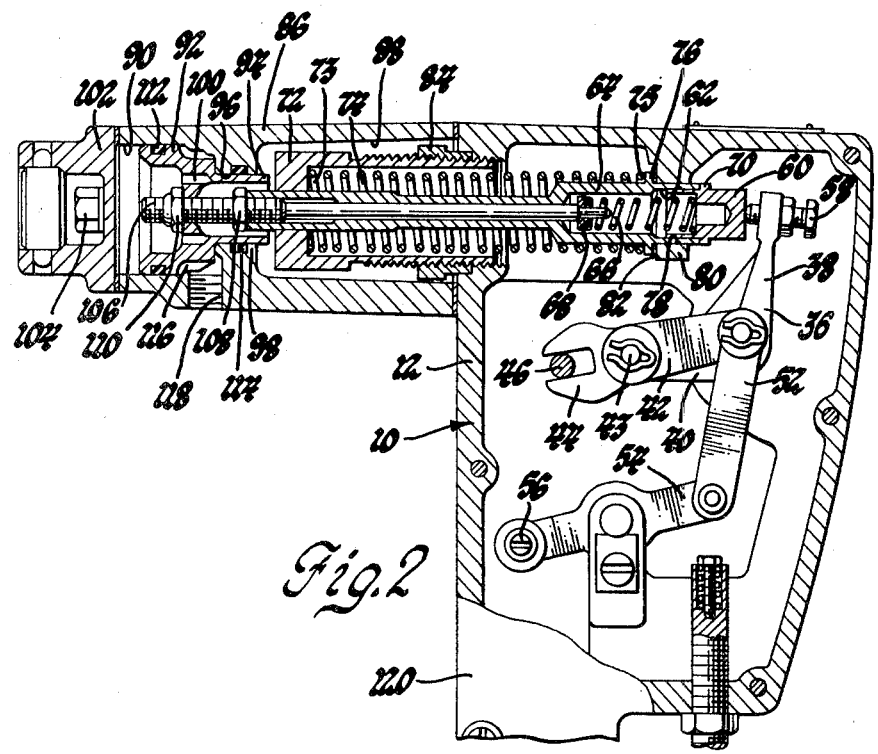
FIG. 2 is a cross-sectional view of the governor of FIG. 1 taken generally in the plane indicated by the line 2—2 of FIG. 1.

Referring now to FIGS. 1 and 2 of the drawings in detail, numeral 10 generally indicates a mechanical engine governor for a compression ignition engine and including a housing 12 having a mounting surface 14 which is adapted to be secured to the end face of the blower housing or other suitable portion of a compression ignition engine.

Within the housing 12 is a rotatable shaft 16, having a splined end portion 18 that is adapted to be connected to the rotating blower shaft, or other suitable portion of the engine, for driving the shaft 16 at a speed proportional to engine speed. Shaft 16 carries a pair of pivotally mounted flyweights 20 which, upon increasing speed, are increasingly urged outwardly by centrifugal force around pivots 22. Fingers 24 extending from the flyweights engage a sleeve 26 which acts through a bearing 28 on an operating fork 30. The fork 30 is connected to an operating shaft 32 that is mounted for oscillation in bearings, only one 34 of which is shown. Operating shaft 32 is fixed to an operating shaft lever 36, having a pair of angularly disposed arms 38, 40.

At the end of arm 40 of the operating shaft lever, a differential lever 42 is pivotably mounted intermediate its ends on a pivot pin 43. One end of arm 42 is bifurcated at 44 to receive the end of a pin 46 extending from operating mechanism 48, which is adapted to be connected through an external lever 50 with the accelerator pedal, not shown, of a vehicle or other means for manual control of the engine by the operator. At its other end, differential lever 42 is pinned to a link 52, which is in turn connected to an oscillating lever 54 having an end portion 56 connectable with engine fuel rack actuating means, not shown, for moving the engine injector racks between their maximum and minimum fuel positions.

The other arm 38 of operating shaft lever 36 carries an adjusting screw 58 which engages a cup-shaped cap 60, carried for reciprocation within a recess 62 of a cylindrical plunger 64. A low (idle) speed spring 66 extends between the cap 60 and a seat 68, operatively connected to the plunger 64 by adjustable means for setting the spring preload. A flange stop 70 on the cap 60 is engagable with the end of the plunger 64 to limit compression of the spring 66 and provide a solid connection thereafter between the lever 36 and plunger 64.

An adjustable cup-like retainer 72 surrounding one end of plunger 64 receives and supports an adjustably fixed end 73 of a high speed spring 74. The other, or operative, end 75 of the spring 74 acts against a flange 76 on the plunger 64, biasing the plunger to the right, as viewed in FIG. 2. Plunger 64 is reciprocably supported in a bore 78 of a support member 80 which forms a portion of the housing 12. An annular abutment 82 surrounds the bore 80 and is located in opposition to the flange 76 of the plunger, which is biased toward the abutment by the high speed spring 74.

It will be noted that retainer 72 is threadably retained in the housing 12 so that its adjustment causes a longitudinal movement of the normally fixed end 73 of the spring 74. This changes the preload setting or force of the operative end 75 of the spring on the plunger flange 76 which determines the normal maximum speed setting for the governor. A nut 84 is provided to lock the retainer 72 in its normally fixed position after the proper adjustment has been made.

The portions of the governor mechanism so far described are substantially the same as or equivalent to the corresponding portions of certain previously known governors on which the governor of the present invention is based. One such governor is shown for example in U.S. Pat. 3,886,922 Frick, which was granted June 3, 1975 to the assignee of the present invention. However, the Frick governor also includes the application of a peak load control spring not shown in the governor arrangement so far described. It should be recognized that such a spring could be utilized in the arrangement of the present invention, if desired.

THE SPEED ADJUSTING MEANS

The present governor differs from the various prior art arrangements in the provision of simple but effective speed adjusting means capable of introducing a variable biasing force acting against the operative end of the high speed spring 74 to permit variable reduction of the preset maximum speed setting of the governor.

In FIGS. 1 and 2, the added or modified components include a combined cover and cylinder member 86, which is mounted on the housing 12 and encloses the retainer 72 and its lock nut 84 within a recess 88 at one end. A second recess 90 defines a cylinder in which there is reciprocably received a speed adjusting piston 92. A reduced diameter portion 94 of the piston extends through and substantially fills an opening 96 extending through a wall 98 between the two recesses 88 and 90. The recesses are connected by an internal passage 100 through the piston 92.

The end of the cylinder 90 is closed by a cover 102, screws 104 being utilized to hold the cover 102 and member 86 in assembly with the housing 12. As shown, cover 102 includes a plug and pin arrangement of the sort shown in U.S. Pat. No. 3,893,441 Hebb, Jr. et al., granted July 8, 1975 to the assignee of the present invention and provided for the purpose of resisting tampering with the governor speed settings by unauthorized personnel.

Piston 92 is secured to the outer end of the governor cylindrical plunger 64 by means of a threaded stud 106. This stud is threaded into the end of the plunger and locked in place by a nut 108. Engagement of the stud with the rod-like end of spring seat 68 provides the previously mentioned operative connection between the spring seat 68 and plunger 64. A second adjusting nut 110 secures the piston on the stud and permits the piston to apply a force against the plunger member in a direction opposing the biasing force of the operative end 75 of the high speed spring 74 against the plunger.

Annular seals 112 and 114, contained respectively in the piston 92 and the wall 98, seal the ends of an annular chamber 116 that is defined between the inner ends of the piston and the cylinder. A threaded opening 118 is provided, connecting the chamber 116 with the exterior of the cylinder member 86 to provide for connection of an air line to supply air at controlled pressures to the chamber 116.

GOVERNOR OPERATION

The operation of the governor arrangement of FIGS. 1 and 2 as above described is as follows.

When its associated engine is in operation, the shaft 16 of the governor will be rotated at a speed proportional to engine speed, causing the flyweights 20 to move outwardly and apply a force that increases with increasing engine speed and tends to rotate the operating shaft lever 36 in a counterclockwise direction as viewed in FIG. 2. Such movement of the speed responsive means (which includes lever 36) moves the pivot pin 43 downwardly, causing the differential lever 42 to swing in a clockwise direction, as shown in FIG. 2, around the pin 46. This movement in turn moves the internal actuating means comprising link 52 and lever 54 in a direction tending to move the external fuel rack actuating mechanism, not shown, of the engine toward the minimum fuel position.

The force generated by the flyweights is opposed initially by the bias of low speed spring 66, the force of the high speed spring 74 being sufficient at normal operating speeds to hold the plunger flange 76 in engagement with the abutment 82, so that the plunger is in its farthest rightward position, as shown in FIG. 2. At idle speeds, the low speed spring 66 extends cap 60 against the adjusting screw 56 in the lever 36 and controls the engine idle speed by yielding or extending as necessary to permit the flyweight force to control fuel flow at the required amount for maintaining idle speed.

Actuation of the foot throttle or accelerator of the vehicle by the operator to increase speed moves the lever 50 so that pin 46 is moved generally downwardly, as shown in FIG. 2, pivoting lever 42 and the internal actuating means toward a fuel increasing position of increased injector rack (assuming a diesel engine is involved). The resultant speed increase causes an increase in force from the flyweights which completely compresses spring 66, causing the stop flange 70 of the cap 60 to engage the end of plunger 64, thus providing a nonyieldable connection between the lever 36 and the plunger.

Between idle and the maximum controlled engine speed, the rack position is set manually by the engine operator. However, when the maximum controlled speed range is reached, the force of the flyweights 20 becomes high enough to begin compressing the high speed spring 74, which yields as necessary to reduce the engine injector output by moving the injector racks toward the minimum fuel position so that the maximum controlled speed is not exceeded.

VARIABLE LIMITING SPEED OPERATION

In accordance with the present invention, the governor speed adjusting piston 92 may be utilized to controllably reduce the maximum operating speed of the engine from that of the maximum governed speed by applying a fluid pressure, such as air pressure, through the opening 118 to the chamber 116, where the fluid pressure acts against the piston 92 urging it leftwardly as shown in FIG. 2. The force of the pressurized fluid on the piston is in turn transmitted to the plunger 64 which, acting through the flange 76, applies this force against the operative end of the high speed spring 74. This reduces the portion of the force of the high speed spring which may be utilized to oppose the action of the governor speed responsive mechanism. Accordingly, as the force of the fluid pressure on speed adjusting piston 92 is increased, the speed at which the governor speed responsive mechanism will overcome the biasing force of the high speed spring becomes lower and lower and, accordingly, the maximum controlled operating speed of the engine becomes lower. Thus, the maximum governed engine speed may be controlled at will by the operator through the provision of suitable means for applying a controlled pressure in the chamber 116 to act upon the speed adjusting system 92. Further, upon removal of such fluid pressure, the governor will be returned to its normal operating condition.

It is noted that with the particular form of speed adjusting arrangement provided wherein the speed reducing biasing force is applied directly on the operative end of the high speed spring, the forces acting on the high speed spring are not increased by the application of fluid pressure against the piston 92. Instead, this biasing force merely acts to reduce the added force which the speed responsive mechanism of the governor must apply in order for the normal speed controlling action of the governor to take effect. It is also noted that the piston 92 and seals 112 and 114 should be designed to minimize sliding friction, since any friction caused by their movement in the cylinder will cause hysteresis in the governor speed control.

DESCRIPTION OF FIG. 3

Figure 3:
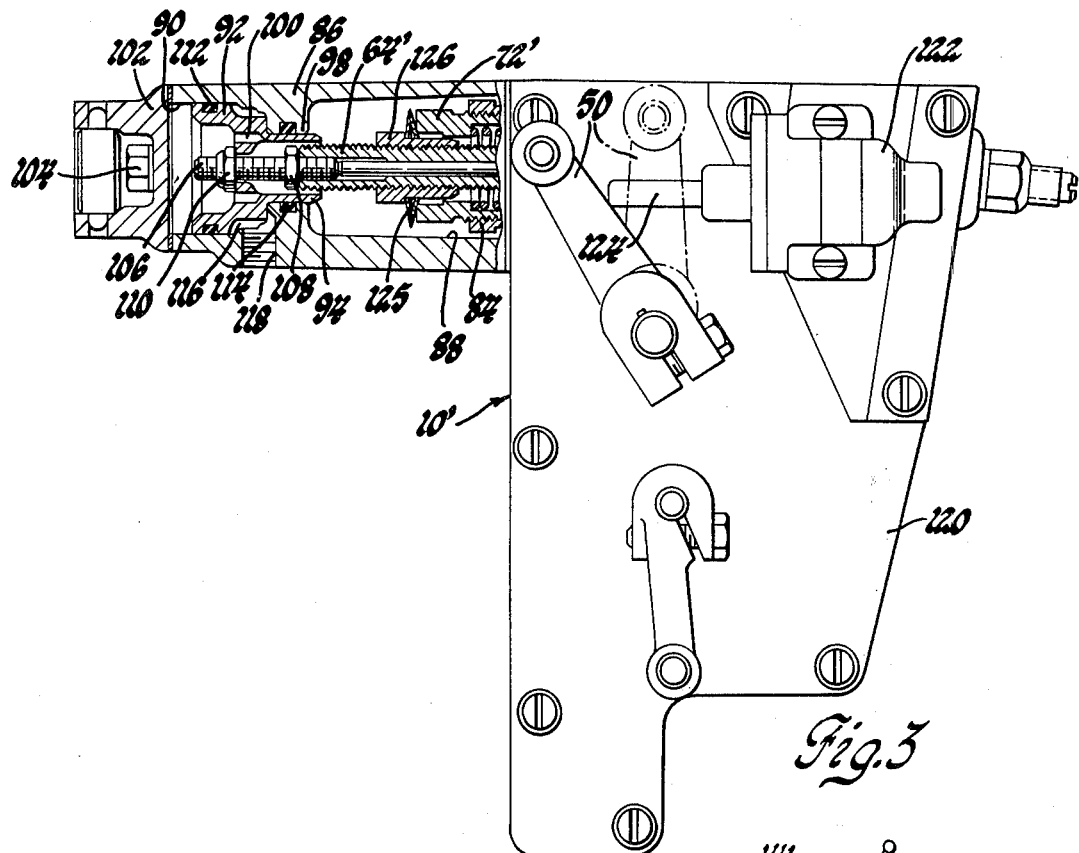
FIG. 3 is a top view partially in section of an alternative embodiment of governor formed according to the invention and showing certain additional features common to both embodiments.

Referring now to FIG. 3 of the drawings, there is shown an alternative embodiment of governor formed according to the present invention. In most of its aspects, the arrangement of the embodiment of FIG. 3 is the same as that of the previously described embodiment. Accordingly, like numerals are used to identify like parts, while primed numerals identify modified components. The figure shows, in addition, the provision on the cover 120 of an air cylinder 122 having a plunger 124 which, when the cylinder is energized, acts against the fuel controlling lever 50 of the governor to move the lever to its maximum fuel position. If desired, the cylinder may be arranged to advance the lever 50 to some other position than maximum fuel but above the idle speed position. Although not shown in the drawings of the embodiment of FIGS. 1 and 2, this cylinder mechanism 122 may also be applied to that embodiment in order to hold the throttle of the governor in the maximum fuel (or lower) position during the time when air pressure is applied to the speed adjusting mechanism of the governor to produce a controlled engine speed.

The mechanism of the FIG. 3 embodiment differs from that of the previously described embodiment in the provision of a peak load control spring mechanism formed by spring washers 125 acting between the modified retainer 72' and an adjusting nut 126 mounted on the threaded exterior of the modified plunger 64' to provide a peak load control function substantially like that of the previously mentioned Frick patent. This portion of the embodiment does not form a part of the present invention, but is included only to show applicability of the present invention to this form of modified peak load control governor.

GOVERNOR CONTROL SYSTEM

Figure 4:
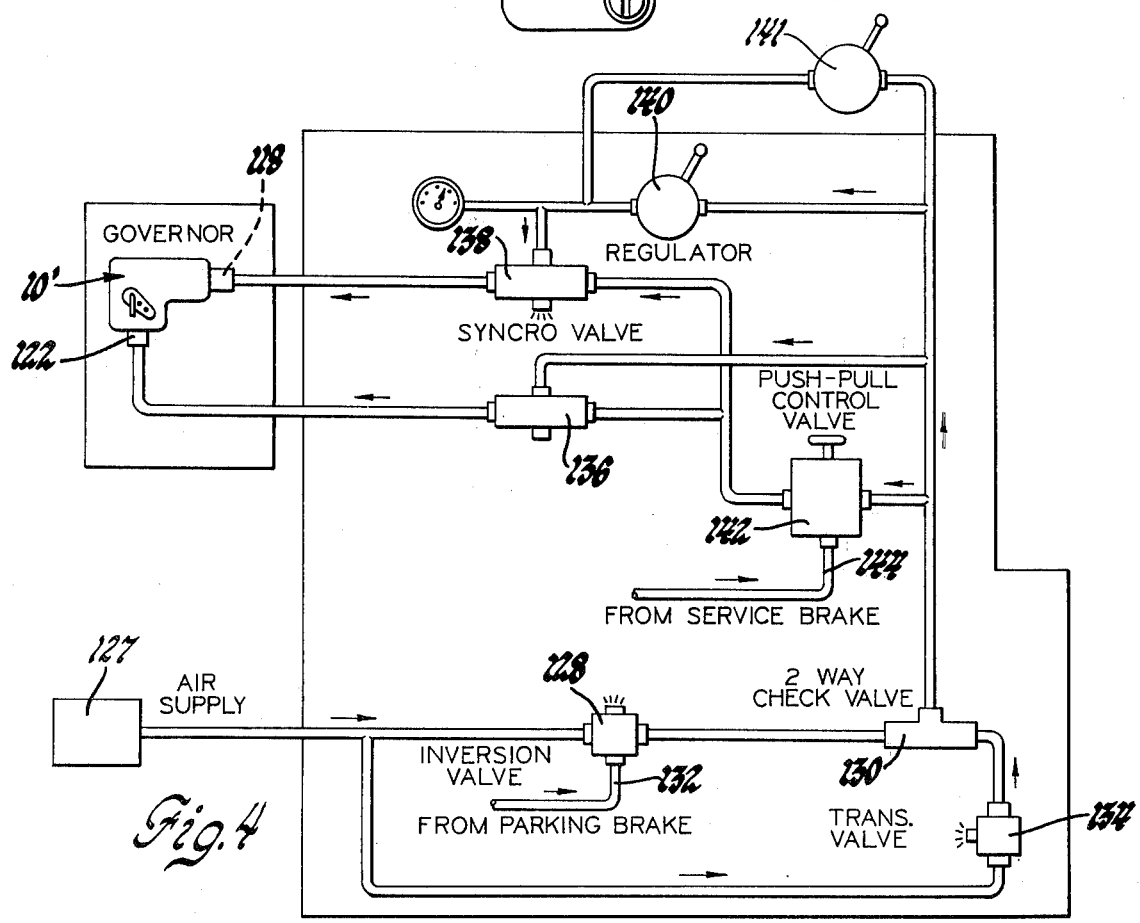
FIG. 4 is a diagrammatic view illustrating an air actuated system connected with a governor according to the present invention and arranged to provide in a vehicle the desired features of road speed control and controlled variable speed engine drive of accessories when the vehicle is stationary.

Referring now to FIG. 4 of the drawings, there is shown diagrammatically one possible arrangement of a control system according to the present invention for use with a governor applied to a vehicle, such as for example a diesel powered highway truck having one or more engine driven accessories such as an unloading pump, a concrete mixing barrel or the like.

In the disclosed system, an air line from the vehicle compressed air supply 127 supplies pressurized air through an inversion valve 128 to one side of a two-way check valve 130. A connection 132 with the parking brake permits the inversion valve 128 to conduct air only when the vehicle parking brake is engaged. Air supply 127 also supplies air through a transmission valve 134 to the other side of the two-way check valve 130. The transmission valve is arranged to conduct air only when the vehicle transmission is operating in its highest range. The check valve 130 is in turn connected with a pair of syncro valves 136 and 138, the latter having an air pressure regulator 140 intervening to permit operator control of the air pressure supplied to valve 138. If desired, a second remotely located pressure regulator 141 may be placed in parallel with regulator 140. Valve 138 supplies the regulated air through the opening 118 of governor 10' to the chamber 116 where it acts upon the speed adjusting piston 92 of the governor. The other syncro valve 136 is connected with the air cylinder 122 of the governor and supplies air thereto for actuating its plunger.

Both syncro valves include air actuated signal portions connected with a push pull control valve 142, which is in turn connected with the check valve 130. Neither of the syncro valves 136 and 138 will permit the passage of any air to the governor unless their signal portions are actuated by air pressure conducted through the push pull control valve 142, which is manually controlled by the operator to ON or OFF positions. A mechanism within the valve 142 moves it to the OFF position, cutting off air flow if the system pressure drops below a preset value adequate for safe operation. In addition, a line 144 from the vehicle service brake is arranged to shut off the push pull control valve 142 whenever the service brake is actuated.

CONTROL SYSTEM OPERATION

The operation of the governor as installed in a vehicle with the control system shown in FIG. 4 is as follows.

When the vehicle is in motion, the system may be used as a road speed control at such time as the vehicle has reached highway speeds and is operating in its highest or direct driving gear with adequate air pressure in the air system. Shifting of the transmission into high gear opens the transmission valve 134, permitting air from the vehicle supply to pass to the syncro valves 136 and 138 and the push pull control valve 142. Actuation of valve 142 to the ON position supplies the required signal to the syncro valves, which then supply air pressure to the governor air cylinder 122 and the speed adjusting piston 92.

Energizing of the air cylinder 122 extends its plunger 124 which mechanically moves lever 50 into position to hold the manual throttle mechanism of the governor in the maximum fuel position. At the same time, the pressure of the air against piston 92 is controlled by the operator through actuation of either regulator 140 or 141 to control the governed speed of the engine and thereby the vehicle in the manner previously described with regard to operation of the governor. Thereafter, subject to slight variation with change in load, the governor will maintain the set speed which may be varied by the operator through adjustment of regulator 140 as long as the control mechanism remains in operation.

Such operation may be terminated by manually shutting off the push pull control valve 142 or by applying the vehicle service brake which also shuts off valve 142. An excessive reduction of the air system pressure will also shut off the valve 142. In addition, shifting of the vehicle to a lower gear will close the transmission valve 134 and cut off air to the control system. When any of these actions occurs, the pressurized air is exhausted from the governor connected mechanisms and the system returns to normal operation, with the operator having full control of engine speed through his manual throttle, while the governor returns to its normal mode of idle and maximum engine speed control.

When the system is used to control engine speed for auxiliary drive, the vehicle must be stopped and the parking brake set in order to permit air to be delivered through the inversion valve 128 and check valve 130 to the syncro valves 136 and 138. Actuation of the push pull control valve 142 then energizes the system so that the engine speed may be controlled by the operator through actuation of the pressure regulator 140. Operation in this mode will be discontinued at such time as the push pull control valve is shut off manually, by operation of the service brake, or by an excessive reduction in system air pressure, or if the parking brake is released.

While the invention has been described by reference to certain preferred governor arrangements and a specific control system for use with such governors, it should be understood that the inventive concepts disclosed are applicable to a much more diverse range of governor types and control systems than have been specifically disclosed herein. Accordingly, it is intended that the invention not be limited, except by the language of the following claims. The term "pressure" as used in the claims is intended to include negative pressures (vacuum) as well as positive pressures. The term "fluid," of course, includes liquids as well as gases.

What is claimed is:

1. The combination in a vehicle engine speed control system of means for manually controlling fuel flow to said engine, a governor for shifting said manually controlled means in a fuel decreasing direction when said engine speed reaches a set maximum value, and the improvement comprising means for maintaining said engine speed at a desired value, said maintaining means including:

means for advancing said manually controlled means to a fuel flow position capable of producing engine speeds above said desired value in response to the application of fluid pressure; means for reducing said set maximum value of said governor to a value representing said desired value in response to the application of a variably controlled fluid pressure; and means for simultaneously actuating said advancing means and said reducing means, said actuating means including a source of fluid pressure, shutoff valve means connected to said fluid pressure source for selectively providing fluid pressure signals, first conduit means connecting said valve means to said advancing means whereby a first one of said fluid pressure signals actuates said advancing means, second conduit means connected to said valve means, and an adjustable regulator connected to said second conduit means for variably controlling a second one of said fluid pressure signals, said variably controlled fluid pressure signal actuating said reducing means, whereby said engine speed is automatically maintained at said desired value when said shutoff valve means provides said fluid pressure signals and said governor prevents said engine speed from exceeding said maximum value under manual control when said shutoff valve does not provide said fluid pressure signals.

2. The combination of claim 1 wherein said shutoff valve means includes valves operable in supply and discharge positions to respectively provide fluid to and discharge fluid from said advancing and reducing means, and means operable to place said valves in their said discharge positions when the pressure of the fluid supplied by said fluid pressure source falls below a preset value.

3. The combination of claim 1 wherein said vehicle includes a parking brake which, when applied, prevents normal movement of the vehicle, and the improvement wherein said control system further comprises second shutoff valve means between said first shutoff valve means and said fluid pressure source and operatively connected with said parking brake so as to permit pressure fluid to be supplied to said setting and actuating means through said second shutoff valve means only when said parking brake is applied.

4. The control system of claim 3 wherein said vehicle has a pressure air system which comprises said fluid pressure source.

5. The combination in a vehicle engine speed control system for a vehicle having a service brake of means for manually controlling fuel flow to said engine, a governor for shifting said manually controlling means in a fuel decreasing direction when said engine speed reaches a set maximum value, and the improvement comprising means for maintaining said engine speed at a desired value, said maintaining means including:

means for advancing said manually controlled means to a fuel flow position capable of producing engine speeds above said desired value in response to the application of fluid pressure; means for reducing said set maximum value of said governor to a value representing said desired value in response to the application of a variably controlled fluid pressure; and means for simultaneously actuating said advancing means and said reducing means, said actuating means including a source of fluid pressure, shutoff valve means connected to said fluid pressure source for selectively providing or cutting off fluid pressure signals, first conduit means connecting said valve means to said advancing means whereby a first one of said fluid pressure signals actuates said advancing means, second conduit means connected to said valve means, and an adjustable regulator connected to said second conduit means for variably controlling a second one of said fluid pressure signals, said variably controlled fluid pressure signal actuating said reducing means, said shutoff valve means being connected with said service brake and operative upon application of said brake to cut off said fluid pressure signals, whereby said engine speed is automatically maintained at said desired value when said shutoff valve means provides said fluid pressure signals and application of said service brake discontinues such speed maintenance and said governor then prevents said engine speed from exceeding said maximum value under manual control.

6. The combination of claim 5 wherein said shutoff valve means includes first valve means controlling said first and second conduit means and movable between flow permitting and flow preventing positions, the latter providing cutoff of the fluid pressure and venting of said conduit means, and pressure responsive cutout means operative upon application of said service brake to move said first valve means to said flow preventing position.

7. The combination of claim 6 wherein such vehicle further includes a transmission having a plurality of drive ratios including a high gear ratio and said control system further comprises a second valve in series with said first valve means and operably connectable with the transmission so as to permit fluid pressure flow between the actuating means and the fluid pressure system through said second valve only when the transmission is in its high gear ratio, whereby the system may be operated as a vehicle speed control when the transmission is in high gear.

8. The combination of claim 7 wherein such vehicle further includes a parking brake which, when applied, prevents normal movement of the vehicle and said control system further comprises a third valve in said connecting means in parallel with said second valve and in series with said first valve means, said third valve being operably connectable with said parking brake so as to permit fluid pressure flow between the actuating means and the fluid pressure system through said third valve only when the parking brake is applied, whereby the system may be used to control engine speed for driving auxiliaries when the vehicle is parked with the parking brake applied.

* * * * *

UNITED STATES PATENT AND TRADEMARK OFFICE
CERTIFICATE OF CORRECTION

PATENT NO. : 4,076,094
DATED : February 28, 1978
INVENTOR(S) : Warren L. Moody and Edward D. Baugh It is certified that error appears in the above-identified patent and that said Letters Patent are hereby corrected as shown below:

Column 1, line 35, "high spring" should read --high speed spring--.

Column 4, line 43, "screw 56" should read --screw 58--.

Column 8, line 45, "manually controlling" should read --manually controlled--.

Signed and Sealed this

Twentieth Day of June 1978

[SEAL]

Attest:

RUTH C. MASON
Attesting Officer

DONALD W. BANNER
Commissioner of Patents and Trademarks